UNITED STATES PATENT OFFICE.

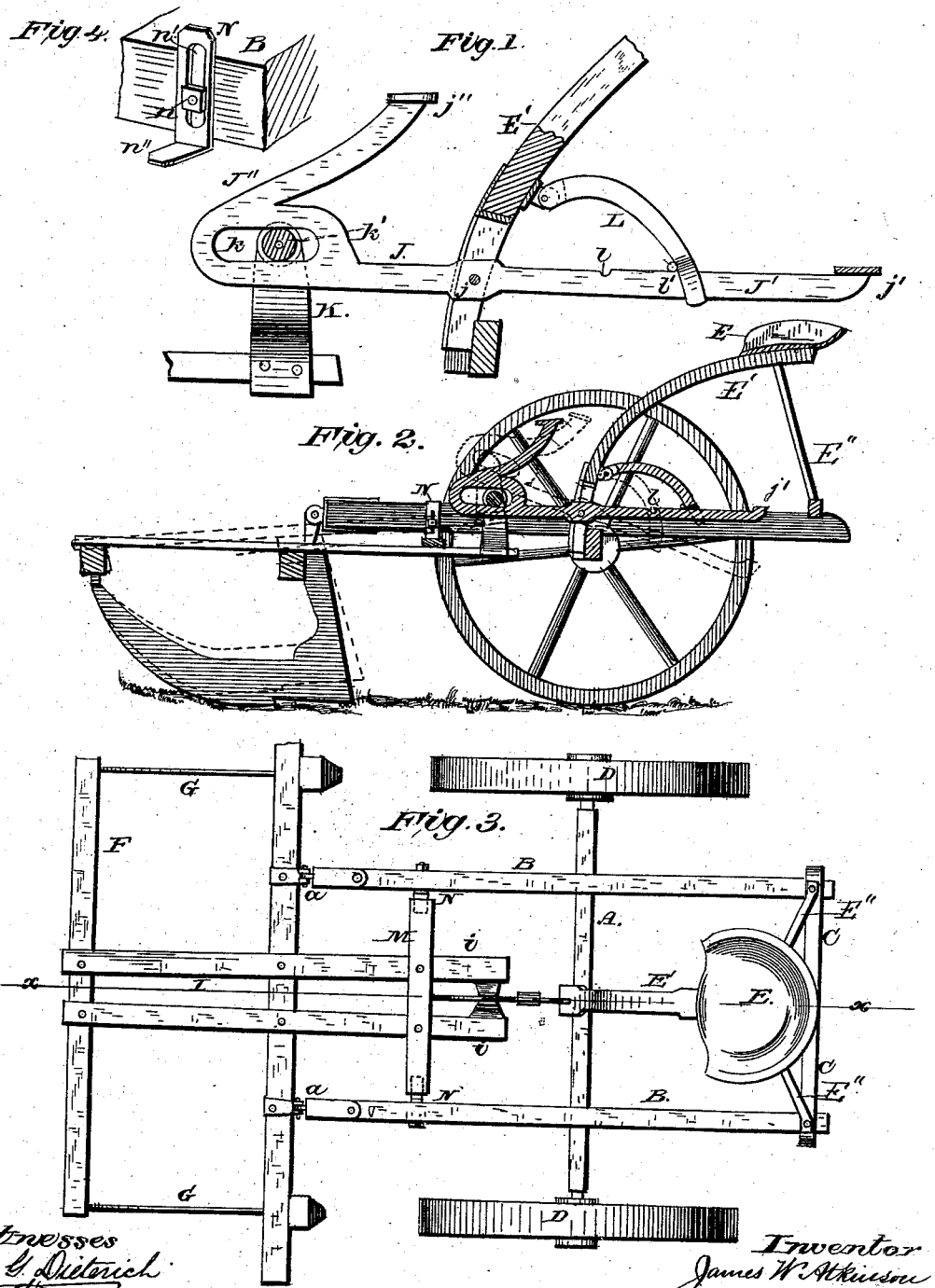

JAMES W. ATKINSON, OF MOLINE, ILLINOIS, ASSIGNOR TO DEERE & MANSUR COMPANY, OF SAME PLACE.

CORN-PLANTER.

SPECIFICATION forming part of Letters Patent No. 225,318, dated March 9, 1880.

Application filed December 6, 1879.

*To all whom it may concern:*

Be it known that I, JAMES W. ATKINSON, of Moline, in the county of Rock Island and State of Illinois, have invented certain new and useful Improvements in Corn-Planters; and I do hereby declare that the following is, a full, clear, and exact description of the invention, which will enable others skilled in the art to which it appertains to make and use the same, reference being had to the accompanying drawings, and to letters of reference marked thereon, which form a part of this specification, in which—

Figure 1 is an enlarged side elevation of the elevating and depressing lever and adjacent parts of the machine. Fig. 2 is a sectional view in the line $x\ x$ in Fig. 3. Fig. 3 is a top-plan view of a corn-planter embodying my invention. Fig. 4 is a perspective view, enlarged, of one of the adjusting-stops.

This invention relates to improvements in corn-planters of that class in which a rear frame is hinged to a forward frame, the rear frame mounted on wheels and supporting the driver's seat, and the front frame generally supported on runners and carrying the seed measuring and discharging devices, and in which a lever is journaled to the rear frame, and arranged so that the driver may operate it with his feet to raise and lower the forward frame; and the invention consists, essentially, in the combination, with the forward and rear frames of a corn-planter hinged or pivoted together, of the slotted lever having the rear end foot plate or plates and forward recurved or upwardly and rearwardly bent end with foot plate or plates, said lever being hinged or pivoted at or near its center to the rear frame, with its forward end connected to an extension of the forward frame for elevating or depressing said frame.

It further consists in the combination, with the forward and rear frames of a corn-planter hinged or pivoted together, of the notched elevating and depressing lever, hinged or pivoted at or near its center to the rear frame, with its forward end connected to an extension of the forward frame and recurved or bent upward and backward, and the detent pawl hinged at its upper end to the seat-supporting frame, and its lower end adapted to engage with said notched lever holding the forward frame in an elevated position.

It finally consists in the combination, with the forward and rear frames of a corn-planter hinged or pivoted together, of the elevating and depressing lever hinged or pivoted to the rear frame, the central and rear extension-bars of the forward frame, connected to said lever and provided with a transverse bar, and the vertically-adjustable plates secured to the rear frame near the front end thereof, for regulating the depth of planting, all as will be hereinafter fully described.

Referring to the drawings by letters, letter A represents the axle; B B, the side bars, and C, the transverse bar, forming the rear frame, mounted on wheels D, and supporting a driver's seat, E, on a curved bar, E', and standards E''. F is the forward frame, with runners G and seed-boxes and central bars, I, having their rear ends, $i$, extending in rear of the forward frame, F. The front and rear frames are hinged to each other at $a\ a$, as shown in the drawings.

J is a lever, preferably pivoted at its mid-length at $j$ in a slot in the seat-supporting bar E', and provided at its rear end, J', with foot-plates $j'$. The forward end, J'', of the lever J is bent upward and backward, as shown at Figs. 1 and 2 of the drawings, and provided at its rear end with a foot-plate, $j''$. In the angle formed by the bend in the lever J a slot, $k$, is formed, which receives a shaft, $k'$, carried in the upper ends of and between standards K, which project upward from the rear ends of the extension-pieces $i$.

L is a detent-pawl, hinged at its upper end to the rear side of the bar E', and its lower end forked so as to retain it in working position astride the rear end of the lever J.

M is a transverse bar secured to and near the rear ends of the extensions $i$.

N N are plates secured one to the inner side of each bar, B, by a bolt, $n$, which passes through a slot, $n'$, in each plate N, and by means of which said plates may be adjusted vertically in the evident manner. The lower ends, $n''$, of the plates N are turned inward, so that the bar M will strike them when it is lowered sufficiently, and thereby limit the extent to which the forward frame may be lowered, and provide means for gaging the depth of planting by adjusting the height of the plates N on the bars B.

In operation the driver may raise the forward frame by pressing with his feet on the rear end of the lever J, and when desired he may depress the rear end of said lever sufficiently to raise the runners G entirely above the ground, when the lower end of the pawl L will engage with a notch, $l$, in the upper side of the lever J and hold the forward frame in an elevated position, as shown by dotted lines at Fig. 2 of the drawings, until released by the driver placing his foot beneath one of the arms $l'$, which project from the side of the pawl L, and lifting said pawl out of the notch $l$.

The driver may press the runners G into the soil with great force, when desired, by placing his feet on the foot-plate $j''$ on the forward end, $J''$, of the lever J.

I am aware that corn-planters in which a rear frame mounted on wheels is hinged to a forward frame carrying the seeding devices mounted on runners, and in which a bent or curved lever, hinged or pivoted to the rear frame and connected to the forward frame, is used to raise and depress said forward frame, and also devices for regulating the depth of planting, are old, and such I do not wish to be understood as claiming, broadly, as my invention.

Having thus described my invention, what I claim as new, and desire to secure by Letters Patent, is—

1. In a corn-planter, the combination, with the forward and rear frames hinged or pivoted together, of the slotted lever J, having the rear end foot plate or plates, $j'$, and forward recurved or upwardly and rearwardly bent end, $J''$, with foot plate or plates $j''$, said lever being hinged or pivoted at or near its center to the rear frame, with its forward end connected to an extension of the forward frame, substantially as and for the purpose herein shown and described.

2. In a corn-planter, the combination, with the forward and rear frames hinged or pivoted together, of the notched elevating and depressing lever J, hinged or pivoted at or near its center to the rear frame, with its forward end connected to an extension of the forward frame and recurved or bent upward and backward, and the detent-pawl L, hinged at its upper end to the seat-supporting frame, and its lower end adapted to engage with said notched lever, substantially as and for the purpose herein shown and described.

3. In a corn-planter, the combination, with the forward and rear frames hinged or pivoted together, of the elevating and depressing lever J, pivoted to the rear frame, the central and rear extension-bars, I I $i$ $i$, of the forward frame, connected to said lever J and provided with a transverse bar, M, and the vertically-adjustable plates N N, secured to the rear frame near the front end thereof, substantially as and for the purpose herein shown and described.

In testimony that I claim the foregoing as my own I affix my signature in presence of two witnesses.

JAMES W. ATKINSON.

Witnesses:
A. B. DICK,
J. M. WATERS.